J. C. COLLETT.
COLLAR STUFFING MACHINE.
APPLICATION FILED AUG. 5, 1910.
999,550.
Patented Aug. 1, 1911.
2 SHEETS—SHEET 1.
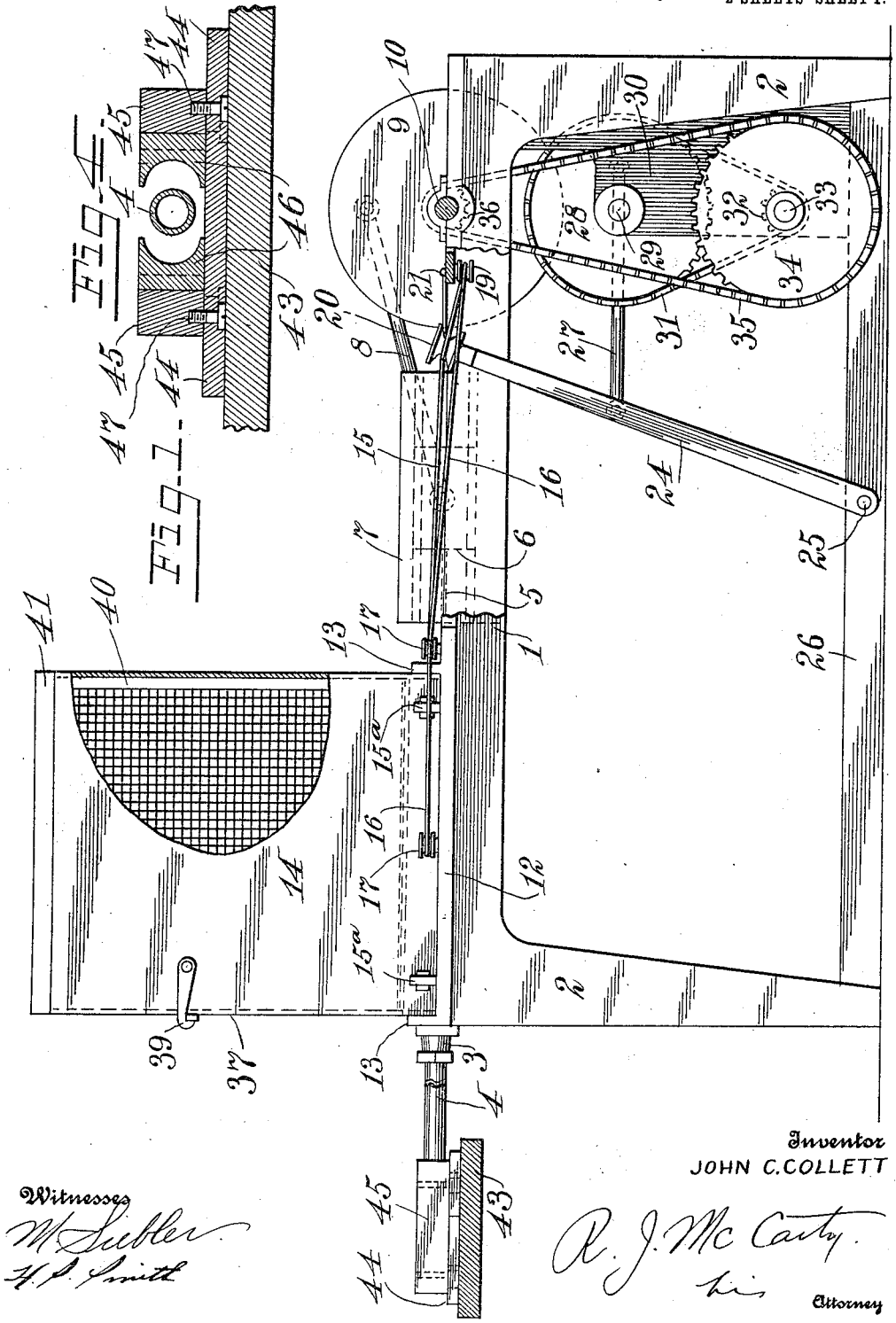
Inventor
JOHN C. COLLETT

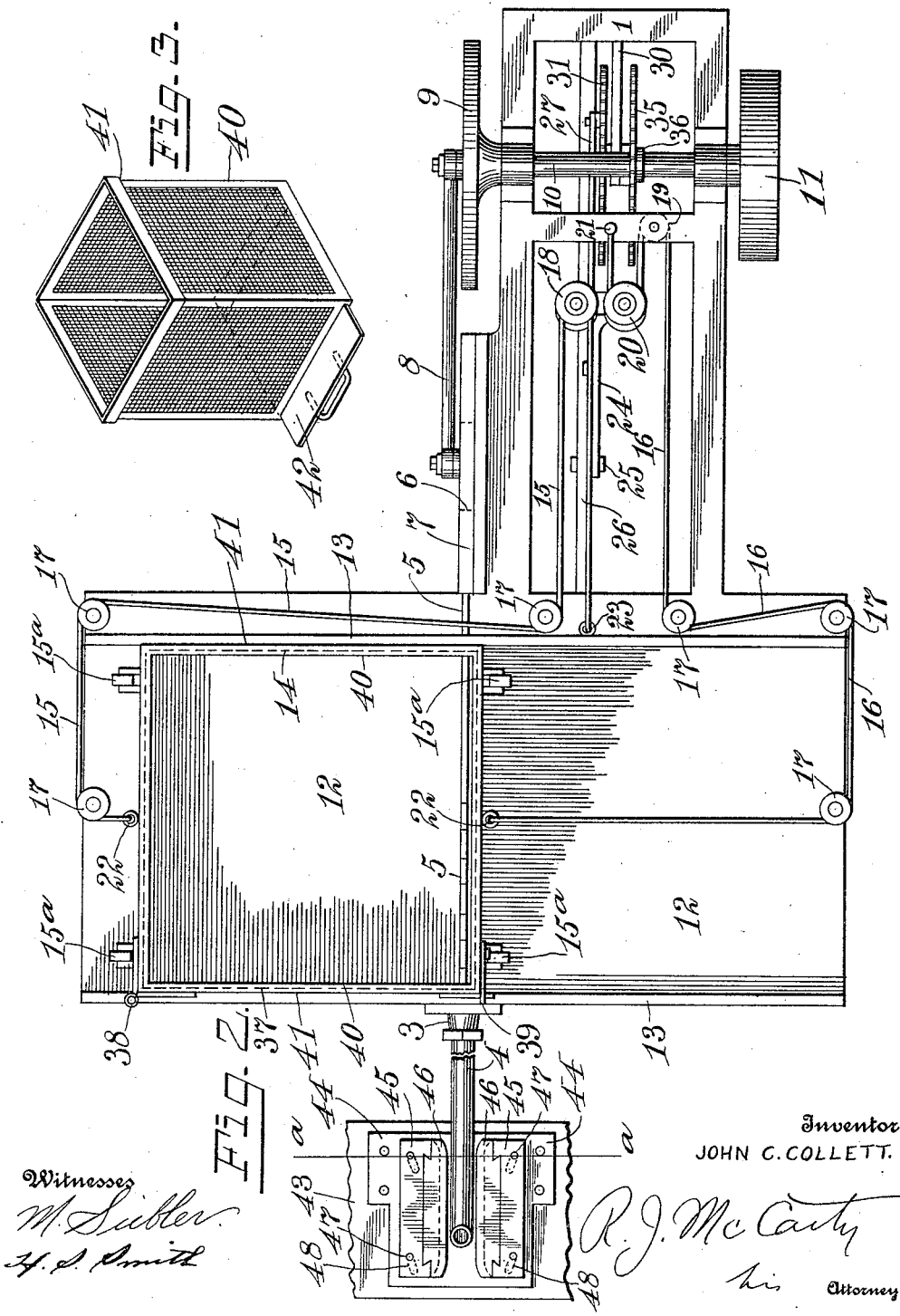

UNITED STATES PATENT OFFICE.

JOHN C. COLLETT, OF DAYTON, OHIO, ASSIGNOR TO THE FOGELSONG MACHINE COMPANY, OF DAYTON, OHIO.

COLLAR-STUFFING MACHINE.

999,550. Specification of Letters Patent. Patented Aug. 1, 1911.

Application filed August 5, 1910. Serial No. 575,611.

*To all whom it may concern:*

Be it known that I, JOHN C. COLLETT, a citizen of the United States, residing at Dayton, in the county of Montgomery and State of Ohio, have invented certain new and useful Improvements in Collar-Stuffing Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in horse collar stuffing machines.

The object of the invention is to provide a horse collar stuffing machine in which tangled straw or hair may be placed, and which will successfully feed and pack the same in the collar; the straw or hair being folded upon itself, thus making the most rigid collar.

Another object of the invention is to provide an improved type of former which shapes the collar and permits of the easy insertion of the stuffing tube within the collar.

Referring to the annexed drawings, Figure 1 is a side elevation with a portion of the hopper broken away; Fig. 2 is a top plan view; Fig. 3 is a perspective view of the removable hopper; and Fig. 4 is a section through the former on the line *a—a* of Fig. 2.

Referring more particularly to the drawings, 1 represents a base supported on legs 2. Attached to the base 1, by means of a clamp 3, is a stuffing tube 4 in which a feed rod 5 is adapted to reciprocate. When the machine is in use, the tube 4 projects into a collar (not shown), and the feed rod feeds, and packs the straw through the tube, into the collar. The feed rod 5 is attached to a cross-head 6 which moves in guides 7 attached to the base 1. The cross-head 6 is pivotally attached to a connecting rod 8, which is in turn pivotally attached to a crank plate 9 on a shaft 10 journaled on the base 1. The shaft 10 is provided with a drive pulley 11, by means of which the shaft 10 is rotated and the feed rod 5 reciprocated.

The straw is supplied to the feed rod 5 as follows: The base 1 is provided with a plate 12 which may be an integral part thereof, and which is provided with flanges 13. The feed rod 5 is adapted to reciprocate across this plate; and mounted thereon, and above the feed rod, is a reciprocating hopper 14. The hopper 14 is preferably square, and is provided with rollers 15$^a$ which engage the plate 12 and which prevents unnecessary friction between the hopper 14 and the plate 12 during the reciprocation of the hopper. During its reciprocation, the hopper is guided on the plate 12 by means of the flanges 13 before referred to. As the interior of the hopper is unobstructed, the straw may be placed therein in a tangled condition and without any previous preparation; and during its reciprocation all the straw will be, at some time, engaged by the feed rod and packed into the collar, as the stroke of the hopper is approximately equal to its width.

The hopper may be reciprocated as follows: Attached at 22 to one side of the hopper 14, is a cable 15, and to the other side at 22, is a cable 16, both of which pass around sheaves 17 on the plates 12 and base 1. The cable 15 extends rearwardly and passes around a sheave 18, and then forwardly, where it is attached to the base 1 at 23. The cable 16 extends rearwardly and around a sheave 19, then forwardly around a sheave 20, and then rearwardly, where it is attached at 21 to the base 1. It will be seen from this arrangement that, if the sheaves 18 and 20 are moved toward the hopper, the effective length of the cable 16 will be shortened, and the hopper 14 will be moved to the opposite end of the plate 12; and if the sheaves 18 and 20 are then moved away from the hopper, the effective length of the cable 15 will be shortened and the hopper 14 will be returned to the position shown in the drawings. The reciprocation of the sheaves 18 and 20 is therefore communicated to the hopper 14 through the cables 15 and 16. The sheaves 18 and 20 are reciprocated as follows: The sheaves 18 and 20 are mounted on the end of a lever 24 pivoted at 25 to a portion 26 of the base 1. The lever 24 is pivotally attached to a connecting rod 27, which is in turn pivotally connected to a sprocket 28. The sprocket 28 is mounted on a stud shaft 29 on a plate 30, and is driven from the main shaft 10 through a reduction gear, which may consist of a chain 31, pinion 32, shaft 33, sprocket 34, chain 35 and pinion 36 on the shaft 10.

In establishments where stuffing machines are employed, it is customary to provide a separate building in which to store the straw, which obviates fire risks. In conveying the straw to the machine, considerable straw would be scattered around the main building, and to obviate this and to make the handling of the straw more convenient, the hopper of the machine is constructed as follows: The front portion 37 of the hopper 14 is hinged at 38, and is provided with a catch 39. When the front portion 37 is opened, there is adapted to be inserted within the hopper 14, a basket 40, shown in perspective in Fig. 3. This basket is of light construction and may be provided with a flange 41 around its upper end, which engages the upper edge of the hopper and which supports the basket within the hopper. There is provided a plurality of these baskets, and while one of them is in use in the machine, the others are being filled at the shed. The bottom 42 of the basket 40 is made removable, and after the basket 40, containing the straw, has been placed within the hopper, the bottom 42 is extracted, which allows the feed rod to engage the straw. The straw within the hopper may fall by gravity, or a plate may be provided, which is a well known expedient.

As before stated, the stuffing tube 4 projects into the collar, and to shape the collar while it is being stuffed, a former is provided as follows: Mounted under the outer end of the tube 4 is a base member 43 which supports a plate 44. Mounted upon the plate 44, and on each side of the tube 4, is a block 45 adapted to receive forming dies 46. The dies 46 are suitably curved on their inner faces, as is clearly shown in Fig. 4, to shape the collar; and as the dies 46 are removable, dies corresponding to the desired shape of the collar may be employed. To enable the tube 4 to be easily inserted within the collar, the dies 46 are made movable as follows: The blocks 45 are provided with pins 47 which enter angular slots 48 in the plate 44. The slots 48 taper inwardly away from the machine; and when it is desired to place a collar on the tube, the dies are pushed toward the machine, when they will open outwardly under the influence of the slots 48. As the collar, when being stuffed, moves away from the machine, the frictional resistance between the collar and the dies will move the dies to their inner position, which is the proper position when shaping the collar.

Without limiting myself to the precise arrangement shown and described, I claim:

1. In a machine of the type specified, the combination with a stuffing tube, a feed rod adapted to reciprocate in said tube, and means for reciprocating said feed rod, of a hopper adapted to reciprocate across the feed rod, and means for reciprocating said hopper.

2. In a machine of the type specified, the combination with a stuffing tube, a feed rod adapted to reciprocate in said tube, and means for reciprocating said rod, of a hopper approximately square in shape, adapted to reciprocate across the feed rod, and means for reciprocating said hopper.

3. In a machine of the type specified, the combination with a stuffing tube, a feed rod adapted to reciprocate in said tube, and means for reciprocating said feed rod, of a hopper adapted to reciprocate across the feed rod, and means for actuating said hopper, said means having flexible connections among its members.

4. In a machine of the type specified, a base, a flanged plate mounted on said base, a stuffing tube extending from said base, a feed rod adapted to reciprocate across said plate and in said tube, a square hopper mounted on said plate between the flanges, means for reciprocating said rod, and means for reciprocating said hopper.

In testimony whereof I affix my signature, in presence of two witnesses.

JOHN C. COLLETT.

Witnesses:
R. J. McCarty,
Matthew Siebler.

---

Copies of this patent may be obtained for five cents each, by addressing the "Commissioner of Patents, Washington, D. C."